No. 630,618. Patented Aug. 8, 1899.
A. T. MARSHALL.
AUTOMATIC REGULATOR FOR ELECTRIC MOTORS.
(Application filed Aug. 29, 1898.)
(No Model.) 2 Sheets—Sheet 1.

Witnesses.
W. J. Baldwin
E. M. Healy

Inventor.
A. T. Marshall.
By
Southgate & Southgate
Attorneys.

No. 630,618. Patented Aug. 8, 1899.
A. T. MARSHALL.
AUTOMATIC REGULATOR FOR ELECTRIC MOTORS.
(Application filed Aug. 29, 1898.)
(No Model.) 2 Sheets—Sheet 2.

Witnesses.
W. J. Baldwin
E. M. Kraby

Inventor.
A. T. Marshall.
By
Southgate & Southgate
Attorneys.

UNITED STATES PATENT OFFICE.

ALBERT T. MARSHALL, OF BROCKTON, MASSACHUSETTS.

AUTOMATIC REGULATOR FOR ELECTRIC MOTORS.

SPECIFICATION forming part of Letters Patent No. 630,618, dated August 8, 1899.

Application filed August 29, 1898. Serial No. 689,749. (No model.)

*To all whom it may concern:*

Be it known that I, ALBERT T. MARSHALL, a citizen of the United States, residing at Brockton, in the county of Plymouth and State of Massachusetts, have invented a new and useful Automatic Regulator for Electric Motors, of which the following is a specification.

My invention relates to an automatic regulator for an electric motor, which has been especially designed for controlling the electric motor actuating the pump of a refrigerating plant.

The object of my present invention is to provide a simple, efficient, inexpensive, and compact automatic rheostat which is especially adapted to be combined and controlled by a thermostat.

To these ends my invention consists of the parts and combinations of parts, as hereinafter described, and more particularly pointed out in the claims at the end of this specification.

Figure 1:
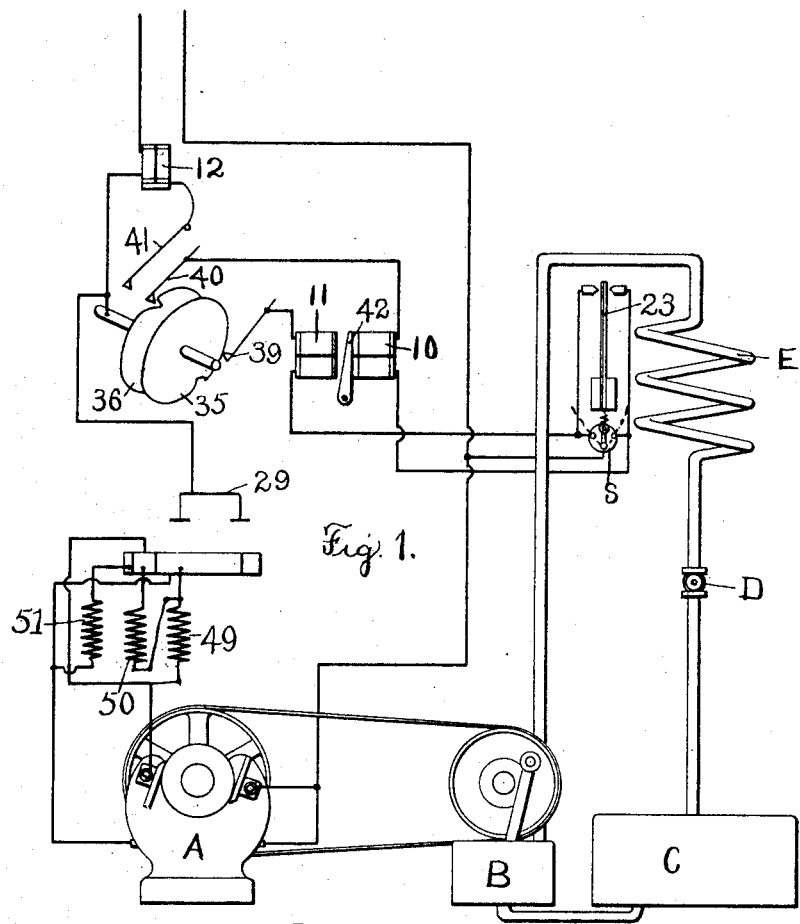
Figure 2:
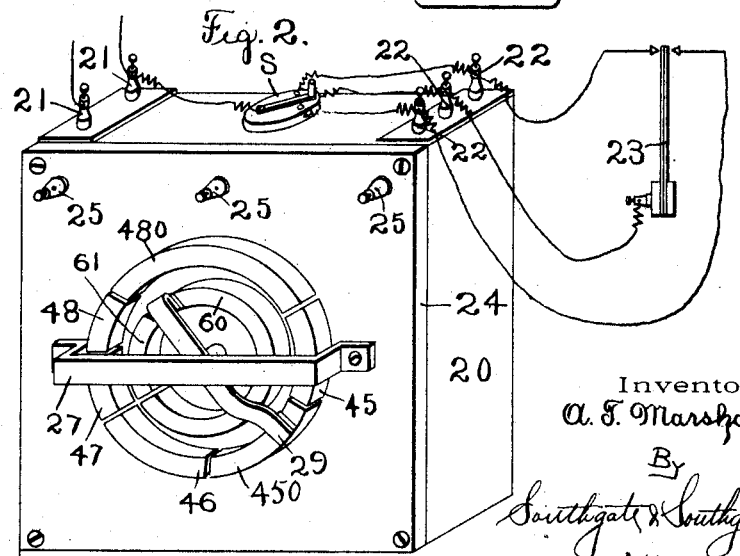
Figure 3:
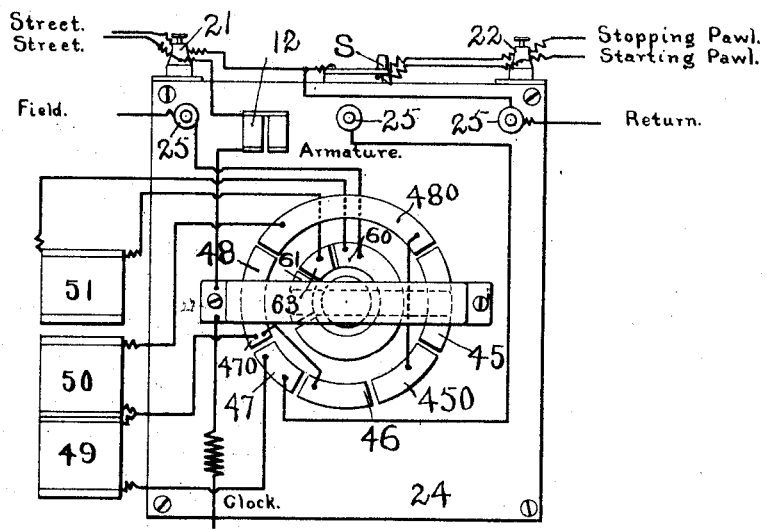
Figure 5:
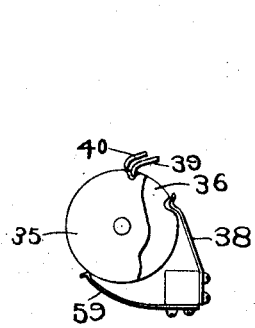
Figure 4:
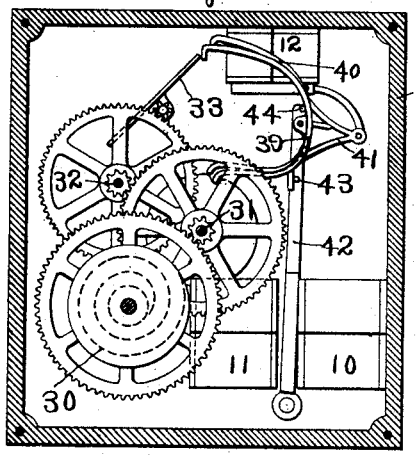
Figure 6:
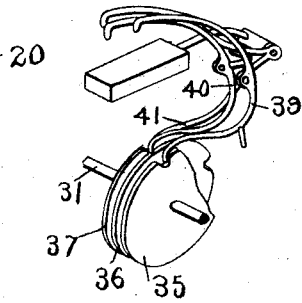
Figure 7:
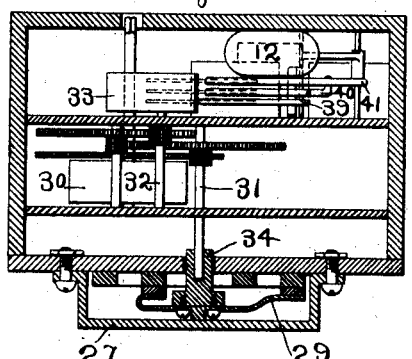

In the accompanying two sheets of drawings, Figure 1 is a diagrammatic view of a refrigerating plant provided with an automatic regulator constructed according to my invention. Fig. 2 is a perspective view of my automatic rheostat combined with a thermostat. Fig. 3 is a diagrammatic view illustrating the electrical connections of the rheostat. Fig. 4 is a sectional view of the same. Figs. 5 and 6 are detail views of the controlling-pawls and contact-pieces to be hereinafter referred to, and Fig. 7 is a sectional plan view of an automatic rheostat constructed according to my invention.

A refrigerating plant for employing anhydrous ammonia or similar expansible medium ordinarily comprises a storage-chamber for the liquid refrigerating medium, a coil or worm in which the refrigerating medium is allowed to expand into a gas, and a pump for condensing the gas back into the form of a liquid, which is returned to the storage-chamber.

In a refrigerating plant which employs an electric motor for driving the pump it is extremely desirable to provide for automatically controlling the motor so that the pump will be run or worked to cause a circulation of the refrigerating medium only at such times as is necessary and will be automatically cut out or its return action stopped when the desired temperature has been reached in the space being refrigerated.

As illustrated diagrammatically in Fig. 1, C designates the storage-chamber for the liquid refrigerating medium; D, the "expansion-valve," as it is termed, which throttles or allows only small quantities of the refrigerating medium to pass into the expansion-coil or worm E, from which the ammonia is pumped by means of a pump B, which in the construction illustrated is belted from an electric motor A. These parts may be of any ordinary or approved construction and need not be herein described at length.

As illustrated in Figs. 2 to 7, inclusive, the automatic regulator which I preferably employ comprises a casing 20, having a binding-post 21 for the line-wires and three binding-posts 22, the center one of which is connected to a thermostat 23, which thermostat 23 may consist of a bar of compound material in the ordinary manner. The outside binding-posts 22 are connected to adjustable contact-pieces which coöperate with the thermostatic bar 23 and also to the electrical connections which control the contact-arm of the rheostat, as hereinafter explained.

A switch, as S, may be arranged on top of the casing 24, so as to pass a current through the stopping or starting connections of the rheostat when it is desired to dispense with an automatic control by the thermostatic bar 23. The front of the casing 20 is closed by a plate of slate or similar material 24, carrying binding-posts 25 and sector-shaped contact-plates near the center thereof, as hereinafter explained. In order to provide for an automatic action, the contact-arm of the rheostat is preferably turned or rotated by means of a train of clockwork, as shown most clearly in Figs. 4 and 7. As illustrated therein, this train of clockwork comprises an ordinary clock-spring 30, which through a gear and pinion drives the main shaft 31. A second shaft 32 is driven from the main shaft 31 by means of a gear and pinion, and a third shaft carrying a regulating plate or fan 33 is driven by a gear and pinion from the second shaft 32. Loosely splined onto the outer end of the main shaft 31 is a block of insulating material, as 34, which carries the spring contact-arm 29, which contact-arm 29 is retained in place by the bridge-piece 27 and has terminals or end pieces coöperating with the sector-shaped contact-strips before referred to.

As illustrated most clearly in Fig. 3, the sector-shaped contact-strips are arranged in two concentric rows, the outer row comprising contact-strips 45, 450, 46, 47, 470, 48, and 480. The inner row comprises contact-strips 60, 61, and 63.

As shown diagrammatically in Fig. 3, the contact-strips 45 and 61 are insulated or without electrical connection with the motor, so that when the spring contact-arm 29 is in the position illustrated by dotted lines in this figure the current will be shut off both from the field and armature of the motor A.

When the spring contact-arm 29 is turned to the right, it will be seen that an electrical connection will be made with the line-wire through the bridge-piece 27 and the spring contact-arm 29, so as to direct the armature-current through the resistance-coils 49 and 50, while at the same time an electrical connection will be made through the bridge-piece 27, the spring contact-arm 29, and contact-strip 60 to inclose the circuit through the field-magnets of the motor. As the contact-arm 29 continues to revolve it will be brought successively into engagement with the contact-strips 48 and 47, thus first cutting out the resistance-coil 50 and then the resistance-coil 49, so that when in engagement with the contact-strip 47 the full strength of the current will be directed through the armature to drive the motor at full speed. The contact-arm of the rheostat will be maintained in this position as long as it is desired to run the motor, and when the motor is to be cut out the contact-arm will be started up again to turn in the same direction.

The contact-strips 46 and 470 and the contact-strips 450 and 480 are connected together, so that the resistance-coil 49 will be first introduced into the armature-circuit. Then the armature-circuit will be directed through both coils 49 and 50 and the circuit through the armature of the motor will be broken, when the contact-arm passes into engagement with the contact-section 45.

The sector-shaped contact-section 63 in the inner line of contact-pieces is arranged to introduce a resistance, as 51, into the field-circuit of the motor just before the motor is shut off, as I have found that by this arrangement I am enabled to substantially prevent all sparking.

Any desired construction may be employed for stopping and starting the clockwork so as to turn the spring contact-arm 29—as, for example, the stopping and starting pawls hereinafter described may be directly actuated by the expansive force of a thermostat; but in practice I preferably control the starting and stopping pawls by suitable magnets.

As illustrated most clearly in Figs. 4 to 6, notched disks 35 and 36 are secured on the main shaft of the clockwork, and coöperating with the notched disk 35 is a stopping-pawl 39 for normally stopping the clockwork to shut off the current of the electric motor and to maintain the parts of the rheostat in the position illustrated in Fig. 3. Coöperating with the notched disk 36 is a starting-pawl 40, which when brought into action will allow the rheostat-arm to turn until the full strength of the current is turned onto the motor. The stopping-pawl 39 and starting-pawl 40, as illustrated, are controlled by pins 43 and 44, respectively, on a pivoted armature-lever 42. The armature-lever 42 is controlled by magnets, as 10 and 11. A shunt from the street-current may be sent through the magnet 10, when the circuit is closed by the thermostatic bar moving to the left, as shown in Fig. 1, and when this takes place the pawl 40 will be lifted from its notched disk 36 and the rheostat-arm will be turned so that the parts will assume the position illustrated in the drawings.

In practice I preferably employ the clockwork itself to form part of the circuit through the magnet 10, the connections of the magnets 10 and 11 with the clockwork being preferably made by insulated spring contact-arms 38 and 59, (see Fig. 5,) which bear upon the notched disks 35 and 36, so that when the parts are in the normal position illustrated in the drawings the shunt-circuit through the stopping-magnet 10 will be broken, as illustrated in Fig. 5.

The thermostatic rod 23 is located in or directly adjacent to the space being refrigerated, and when the temperature rises from the desired limit the thermostatic rod will complete a shunt-circuit through the magnet 11, so that the pivoted armature or lever 42 will be shifted from the position shown in the drawings, the stopping-pawl 39 will be thrown out by the pin 43, and the starting-pawl 40 will be released to engage the notch in the stopping-disk, thus lowering the tailpiece of the stopping-pawl into the path of the plate or fan 33 when the rheostat-arm has been turned by the clockwork to direct the current through the motor, while at the same time the circuit through the spring contact-arm 59 and notched disk 36 will be broken. The starting and stopping pawls 39 and 40 are preferably provided with foot-pieces for engaging the fan or plate 33 in this manner, although, if preferred, the notches in the disk may, if desired, be made of such a shape as to act as ratchet-teeth to control the clockwork.

By employing a spring rheostat-arm 29, which is confined in place beneath the bridge-piece 27, it will be noted that the rheostat-arm will exert a spring-pressure both on its contact sections or feet and on the bridge-piece, and by means of this construction nearly perfect electrical connections will be made between the bridge-piece 27 and rheostat-arm 29 and between the rheostat-arm 29 and the sector-shaped contact-pieces which coöperate therewith.

If the street or line current should be shut off or interrupted for any reason while the motor is running and then be turned on again suddenly, the armature of the motor would be liable to burn out or be injured; and a further object of my invention is to provide a stationary cut-out device which will automatically shift the rheostat to a stopping position whenever the current is broken. To accomplish this purpose, I may weight or balance the stopping-pawl 39 and provide an electric magnet for normally holding the same up out of the way while the street-current remains uninterrupted, but which will automatically release said stopping-pawl if the current in the street should be broken, or I may provide a supplemental pawl for accomplishing this purpose. As illustrated, I may employ a third notched disk 37, secured on the main shaft 31, and coöperating with the notched disk 37 I may employ a supplemental pawl 41. The supplemental pawl 41 is arranged to engage an arm or pinion projecting from the starting-pawl 40. The supplemental pawl 41 is normally held up out of the way by a magnet 12, which is included in the circuit from the street-wires, so that as long as the current is turned on and the motor is being driven the supplemental pawl will not interfere with the action of the stopping and starting pawls. When, however, the street-current is shut off, the magnet 12 will no longer be energized and the supplemental pawl 41 will be allowed to drop and will engage the pin or projection carried by the starting-pawl 40, so that the starting-pawl 40 will be lifted and the clockwork released to turn the rheostat-arm into stopping position.

I am aware that an automatic rheostat constructed according to my invention may be controlled by a hand-switch, as S, or by some different instrumentality than the thermostatic bar 23, and that it may be employed in connection with other species of apparatus than refrigerating plants. I am also aware that the same may be differently wired or connected; but I prefer to arrange the circuits as herein described and illustrated diagrammatically in Fig. 1, as by connecting the same in this manner only a shunt-circuit from the street will be sent through the stopping-magnet 10 or the starting-magnet 11, and when either of said magnets has been operated its circuit will be automatically broken at the spring contact-arms 38 and 59. This arrangement completes a circuit or allows a current to be used only when the motor is running. If preferred, however, the safety-magnet 12 may be located in a shunt-circuit from the line-wires, and if this construction is adopted a small amount of current will be constantly utilized, but will have the advantage of not requiring the entire working current to pass through the safety-magnet 12.

In this application for patent I do not seek to cover any special construction of refrigerating apparatus, nor do I seek to cover, broadly, the combination of a refrigerating apparatus with an automatic combined thermostat and rheostat, as I have claimed this subject-matter in a companion application for patent, filed June 4, 1897, Serial No. 639,228; but, Having fully described my invention, what I do claim, and desire to secure by Letters Patent of the United States, is—

1. In an automatic regulator for electric motors, the combination of a contact-arm, means normally tending to move said contact-arm in one direction, a thermostat, and means controlled by the thermostat for stopping the contact-arm in different relative positions, substantially as described.

2. In a rheostat, the combination of stationary contact-sections, a bridge-piece 27, a spring contact-arm 29 confined in position by said bridge-piece so as to exert a spring-pressure upon said bridge-piece and stationary contact-sections, and means for turning said contact-arm, substantially as described.

3. The combination of a rheostat, comprising a rotary contact-arm, clockwork for turning said contact-arm in one direction, pawls for stopping said clockwork in different relative positions, and a thermostat connected to control said pawls, substantially as described.

4. The combination of a rotary contact-arm, clockwork for turning said contact-arm in one direction, notched disks turned by said clockwork, pawls having foot-pieces for engaging the notched disks, and a thermostat connected to control said pawls, substantially as described.

5. The combination of clockwork, comprising a spring 30 operating a train of gearing, and a fan 33, notched disks 35 and 36, a contact-arm coöperating with a plurality of stationary contact-sections, pawls 39 and 40 having foot-pieces coöperating with the notched disks 35 and 36 and fan 33, a lever 42 having pins controlling said pawls, and a thermostat connected to operate said lever 42, substantially as described.

6. The combination of a rotary contact-arm, clockwork for turning said contact-arm in one direction, pawls for stopping said clockwork in different relative positions, a pivoted lever or armature for operating said pawls, magnets for shifting the armature, a thermostat for energizing said magnets, and means controlled by the clockwork for breaking the circuit through either magnet when the same has operated, substantially as described.

7. The combination of clockwork, comprising a spring 61 operating a train of gearing, a fan 33, notched disks 35 and 36, a spring contact-arm 29 coöperating with a plurality of stationary contact-sections, pivoted pawls 39 and 40 having foot-pieces coöperating with the fan 33 and notched disks 35 and 36, a pivoted armature or lever 42 controlling said pawls, magnets 10 and 11 for the pivoted armature 42, a thermostatic rod 23 for energizing said magnets respectively, and spring contact-arms 38 and 39 for interrupting the circuits through the magnets 12 and 11 respectively, substantially as described.

8. The combination of an electric motor, a rheostat, clockwork controlling said rheostat, starting and stopping pawls for stopping the rheostat in position to drive and stop said motor respectively, and a supplemental weighted pawl connected to throw out the starting-pawl to permit the clockwork to turn the rheostat into position to cut out the motor, and a magnet for normally holding up said supplemental pawl while the motor is running, substantially as described.

In testimony whereof I have hereunto set my hand in the presence of two subscribing witnesses.

ALBERT T. MARSHALL.

Witnesses:
LOUIS W. SOUTHGATE,
PHILIP W. SOUTHGATE.